Dec. 29, 1959 J. M. SNODGRASS ET AL 2,919,420
SEALED SWIVEL CONNECTOR
Filed Feb. 2, 1959
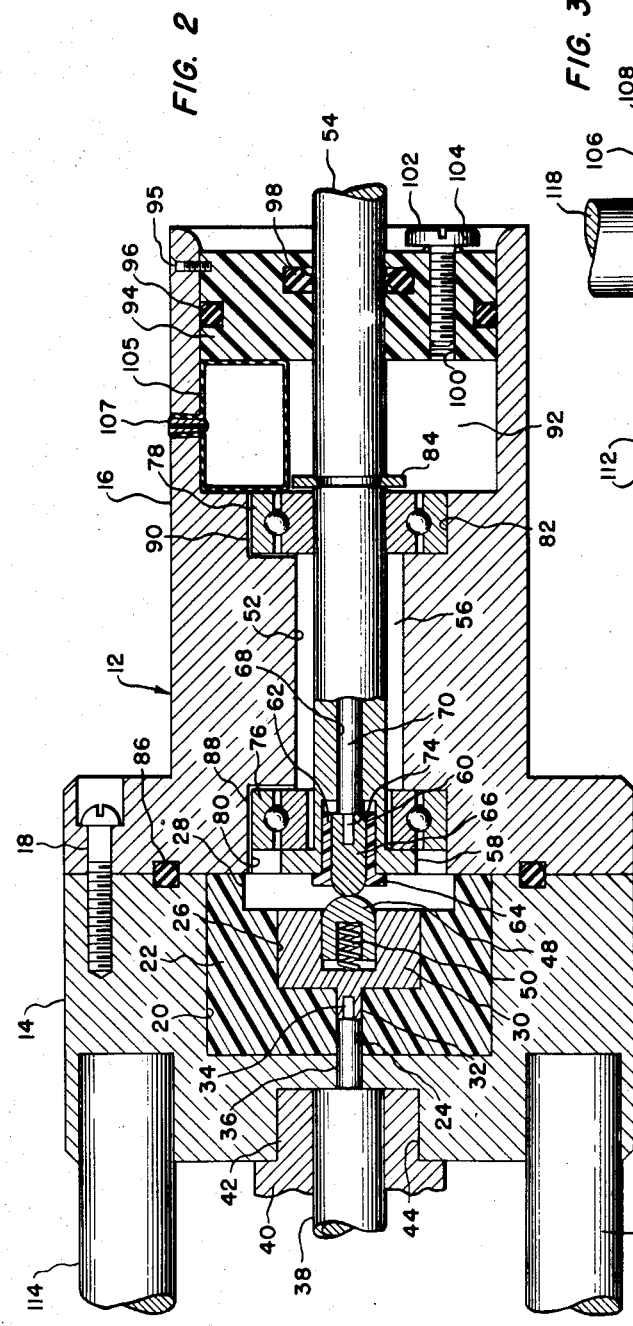
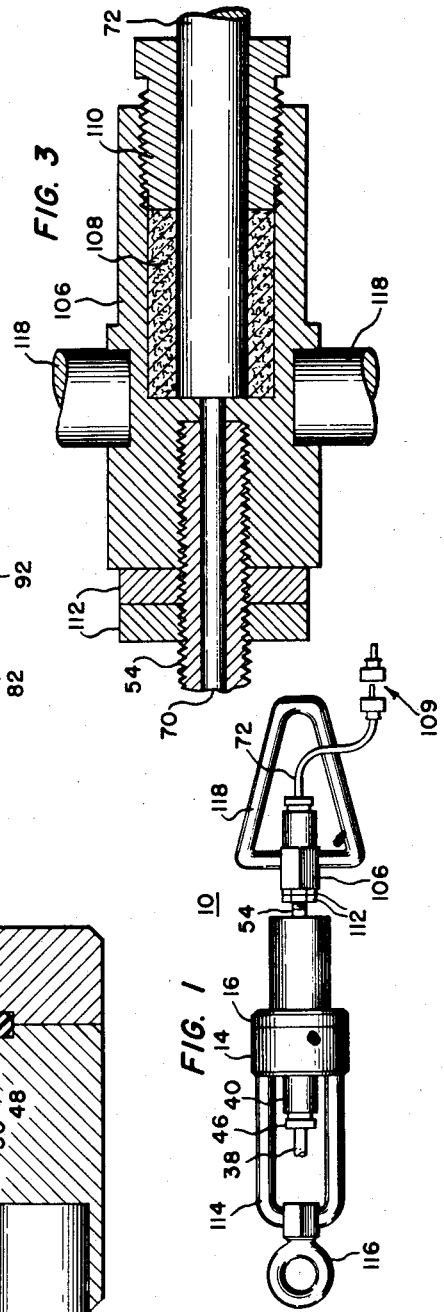
INVENTORS
JAMES M. SNODGRASS
PAUL C. FLEISCHER
BY *Fulwider, Mattingly & Huntley*
ATTORNEYS

United States Patent Office 2,919,420
Patented Dec. 29, 1959

2,919,420

SEALED SWIVEL CONNECTOR

James M. Snodgrass and Paul C. Fleischer, La Jolla, Calif., assignors to The Regents of the University of California Application February 2, 1959, Serial No. 790,647

10 Claims. (Cl. 339—8)

The present invention relates to a swivel connector and more particularly to a swivel connector for underwater use and characterized in that a minimum of torque is required to effect relative rotation between the two end portions of the swivel.

The present invention is particularly useful in the underwater support or suspension of hydrographic equipment at great depths. It is frequently necessary that such hydrographic equipment indicate the direction and speed of water currents, and for this reason the present swivel connector has been designed to be very responsive to slight torque forces tending to cause relative rotation between that portion of the swivel from which the equipment is suspended and that portion of the swivel which is supported by the oceanographic or research vessel. It will be apparent that the accuracy of current direction readings will be controlled in large part by the sensitivity and responsiveness of the swivel connector to small torque forces, and for this reason the present connector has been designed to operate with extremely low internal friction.

More particularly, the present swivel connector comprises a longitudinally extending housing which is formed to receive an electrical cable at one end. A contact member is insulatably carried within the housing and is connected to the cable, compressible packing or other sealing material being disposed between the housing and the cable to effect a watertight connection. A tubular member is disposed through the other end of the housing, and is rotatably carried therewithin, the tubular member being adapted to receive a second cable. A second contact member is carried at the inner end of the tubular member, where it is connected to the second cable and is in contact with the first contact member. The pair of contact members are arranged in axial alignment so that during relative rotation between the housing and the tubular member the contact members are always in engagement to provide electrical continuity. Packing material or similar sealing means is disposed between the second cable and the tubular member externally of the housing to provide a watertight relationship therebetween. One end of the housing is mounted to a supporting line or cable which is suspended from a vessel, for example, and the outer end of the tubular member serves to support the equipment or apparatus in question.

Electrical signals generated by such apparatus or equipment are carried through the second cable, through the pair of contact members, and thence through the first cable up to the vessel on the surface. The tubular member is relatively rotatable with respect to the housing, and since one contact member is carried by the housing and the other contact member is carried by the tubular member, it will be seen that the relative rotational movement between the housing and the tubular member will not disturb the electrical continuity between the suspended equipment and the surface vessel. However, as previously stated, it is an important object of the present invention to provide minimum internal friction so that relative rotational movement between the housing and the tubular member readily occurs in response to slight torque forces exerted upon either the housing or the tubular member. Therefore, bearing means are provided between the tubular member and the housing, such bearings being preferably of the ball or roller type for minimum friction, although similar types of low friction bearings may also be used. Since these bearings produce or are characterized by very low friction, the only appreciable friction existing in the present connector results from the sealing means which are provided to prevent the ingress of water to the interior of the connector. More particularly, the interior open spaces within the housing defined by the complemental or confronting wall portions of the tubular member and the housing, are filled with insulating fluid such as oil. This oil surrounds the contact members, and serves not only as an insulator but also as a lubricant. The inner spaces of the connector thus form an oil chamber, which is closed at one end by a plug.

An expansible bladder or diaphragm is disposed within the oil chamber, the diaphragm being vented to the outside so that the diaphragm will expand and contract in response to the outside pressure. The diaphragm thus expands and contracts in accordance with variation in the magnitude of the underwater pressure to thereby effect pressure equilization between the internal oil and the external water.

The sealing means provided to prevent the ingress of water into the oil chamber of the present connector comprises a single, resilient, annular member arranged between the end plug and the tubular member. The tubular member is preferably made only slightly greater in diameter than the diameter of the cable which it carries so that the peripheral length of the sealing member is minimized, thereby reducing the area of contact and consequently reducing the friction occurring during relative rotation between the tubular member and the housing which carries the plug. It will be apparent that this location of the sealing member on a minor diameter has great advantages over seals operative upon a major diameter.

Other objects and features of the present invention will be readily apparent to those skilled in the art from the following specification and appended drawings wherein is illustrated a preferred form of the invention, and in which:

Figure 1 is a longitudinal elevational view of the swivel connector of the present invention;

Figure 2 is a longitudinal sectional view, on an enlarged scale, of the main or central body portion of the connector of Figure 1; and Figure 3 is a longitudinal sectional view, on an enlarged scale, of the sealing means provided between the cable and the tubular member.

Referring now to the drawings, there is illustrated a swivel connector, designated generally by the numeral 10, which is designed for underwater use in the suspension, for example, of hydrographic equipment from a surface vessel. For simplicity, the weight supporting cables which support connector 10 from the surface vessel, and the cables which support the hydrographic equipment below connector 10, are not illustrated. In addition, since connector 10 obviously may be used in various other applications which will immediately suggest themselves to those skilled in the art, the description herein of connector 10 in association with hydrographic equipment is merely by way of illustration and not by way of limitation.

Connector 10 is of particular utility in the underwater suspension of hydrographic equipment which must quickly orient itself with underwater currents to continuously indicate the direction thereof. For this purpose connector 10 is supported at its upper portion by cables (not shown) to the surface ship, and supports at its lower portion the hydrographic equipment (not shown). As relative rotation occurs between the hydrographic equipment and the ship, torque forces will be applied to the supporting cables, and connector 10 quickly takes out such torque forces through relative rotation of its upper and lower portions whereby minimum resistance is offered to relative rotation between the hydrographic equipment and the ship, and undesirable twisting of the supporting cables does not occur.

In addition, as will be seen, connector 10 is adapted to carry electrical cables for the electrical transmission of data from the hydrographic equipment to the ship, and is also adapted to maintain electrical continuity therebetween at all times, including those periods when relative rotation is occurring between the portions of connector 10.

More particularly, connector 10 comprises an open ended and longitudinal extending housing 12 preferably made of brass or the like, and which comprises a left end or upper portion 14 and a right end or lower portion 16. The terms "upper" and "lower" indicate the preferred disposition of connector 10 in use. Portions 14 and 16 are rigidly connected together by a plurality of machine screws 18, only one of which is illustrated in Figure 1. Upper portion 14 is preferably cylindrical in configuration and is provided with an internal bore 20 for accepting an insulating block 22 made of any suitable insulating material such as Micarta or the like. Insulating block 22 is provided with a central or axial opening 24 in communication with a larger bore 26 and a still larger bore 28 provided in block 22. A contact holder 30, preferably made of brass, is carried within bore 26 and includes an upwardly extending reduced diameter portion 32 fitted within opening 24, portion 32 having a central bore therein for accepting the lower end of a conductor 34 carried within an insulating sheath 36 which is carried within a cable 38. Conductor 34 is preferably soldered within the bore of portion 32 to provide electrical continuity therebetween.

Cable 38 is disposed through an axial bore provided in an end fitting 40 of housing 12, and end fitting 40 is provided with a lower reduced diameter portion 42 which is secured, as by welding or silver soldering, within a bore 44 provided in the upper or left end portion of upper portion 14. The securement of end fitting 40 within bore 44 provides a fluid-tight relationship therebetween, and, as will hereinafter be described, a sealing means 46, Figure 1, is further provided to maintain a fluid-tight relationship between cable 38 and end fitting 40 of housing 12.

Holder 30 is provided with an axial bore in its lower face for slidably accepting an axially or longitudinally movable contact member 48. An electrically conductive bias means or spring 50 is disposed within a central bore in member 48 with its ends adjacent member 48 and holder 30 whereby its bias tends to urge member 48 to the right or downwardly, as viewed in Figure 2. As will be apparent, conductor 34 and member 48 are insulated from housing 12 by the provision of insulating block 22.

Portion 16 is provided with an axial bore 52 for rotatably accepting a tubular member 54, and the confronting or complemental wall portions of tubular member 54 and portion 16 are spaced apart to define an annular chamber 56. In addition, tubular member 54 is provided at its upper end with an annular flange 58 and an internal bore 60 within which is rigidly carried an annular insulating element 62 having a collar or flange 64 which abuts against the upper face of flange 58. Insulating element 62 serves to rigidly carry a contact member 66, and insulate it from tubular member 54 and housing 12.

Tubular member 54 and the contacts 48 and 66 are preferably mounted in axial alignment with contacts 48 and 66 in contacting relationship. Further, contacts 48 and 66 are provided with a radius at their abutting portions so that point contact is maintained therebetween at all times during relative rotational movement between tubular member 54 and housing 12, both contacts 48 and 66 preferably being gold plated to improve the electrical contact therebetween.

Bore 60 is formed as a continuation of a longitudinally extending or axial bore 68 provided through the length of tubular member 54, and an insulating sheath 70 of a cable 72, Figure 3, is carried within bore 68 of member 54. A conductor 74 carried within sheath 70 is soldered within a central bore provided in the lower end of member 66 whereby electrical continuity is provided with member 66, element 62 insulating conductor 74 from housing 12.

Tubular member 54 is freely rotatable within housing 12 by reason of the provision of a pair of bearings 76 and 78, bearing 76 being carried within a counterbore 80 provided in the upper end of the lower portion 16 of housing 12, and bearing 78 being carried within a counterbore 82 provided in the lower portion of housing 12. The pair of bearings 76 and 78 are preferably of the roller bearing type and permit rotational movement of tubular element 54 with a minimum of frictional resistance. Bearing 76 is maintained in position between the base of the counterbore 80 and the under face of flange 58 of tubular member 54, and bearing 78 is maintained in position between the base of the counterbore 82 and a lock ring 84 which is keyed to tubular element 54, as best illustrated in Figure 2.

The securement between the mating surface of the upper and lower portions 14 and 16 of housing 12 is rendered fluid-tight by reason of the provision of an O-ring 86. In this regard it is noted that bearings 76 and 78 do not perform a sealing function, but, on the contrary, a pair of passageways 88 and 90 are cut around bearings 76 and 78, respectively, to permit fluid passage of insulating fluid or oil about the bearings and into the open area around contact members 48 and 66 and within chamber 56.

The lower end of lower portion 16 of housing 12 is bored out at 92 to provide a cylindrical space within which a closure or plug 94 is fixed by means of a set screw 95. Plug 94 serves as an end wall for housing 12 and slidably accepts tubular member 54. A fluid seal, such as an O-ring 96, is carried at the periphery of plug 94 adjacent the inner wall of bore 92 to effect a fluid-tight relationship therebetween. A form of O-ring 98 is mounted within a suitable annular opening in plug 94, and a reduced diameter web element of O-ring 98 extends inwardly into sealing contact with the outer surface of tubular member 54. This O-ring 98 provides the sole seal means tending to impose any frictional resistance to relative rotational movement between housing 12 and tubular member 54. Because of this fact the internal resistance of swivel connector 10 is very low, and only very slight torque loads on either tubular member 54 or housing 12 will be effective to cause relative rotational movement therebetween.

In order to provide lubrication and insulating properties, an insulating fluid such as oil is introduced through a longitudinally extending opening 100 provided through piston 94 and the base of bore 92. A filling means or closure element 102 is threaded into opening 100 to seal it off, and a seal ring 104 is provided to insure a fluid-tight relationship.

A resilient bladder or diaphragm 105, made of neoprene rubber or the like, is disposed within bore 92 with its inlet part carried within an opening in the wall of housing 12. A plug 107 is press fitted within such opening to maintain diaphragm 105 in position, plug 107 being provided with a central opening so that communication is had between the interior of diaphragm 105 and the exterior of connector 10. With this arrangement, the interior of diaphragm 105 is acted upon by sea water pressure, and it expands or contracts until there is pressure equalization between the oil filled interior of connector 10 and the exterior water. In this manner very little or no leakage occurs across the end wall or plug 94.

The sealing means for providing a watertight relationship between cable 72 and tubular member 54 is illustrated in Figure 3, and comprises a seal holder 106 which is bored at its upper end to threadably accept the end of tubular member 54, and bored at its lower end to accept compressible packing material 108 and a sealing plug 110 threadably inserted into seal holder 106 and against material 108. A pair of lock washers 112 rigidly secure the end of tubular member 54 within seal holder 106. As will be apparent, tightening of plug 110 causes material 108 to be compressed upon the periphery of cable 72 and thereby prevent oil from passing axially outwardly through the interior of sheath 70. In addition, a male-female plug connection, such as at 109, Figure 1, may be provided to completely prevent oil from seeping through the interior of cables 72 and 38.

In similar fashion, end fitting 40, which is a part of the upper portion 14 of housing 12, constitutes a seal holder similar to seal holder 106. Fitting 40 is essentially identical to seal holder 106 in that it is centrally bored to accept a sealing plug and packing material (not shown) which by their action tend to urge the packing material against cable 38 to prevent fluid leakage through the interior of sheath 36. Because the construction of fitting 40 in this regard is substantially identical to seal holder 106, it will not be described in detail.

Connector 10 is supported from the surface vessel by a brass rod 114 which is silver soldered to portion 14 and to an eye-bolt 116. Similarly, a brass rod 118 is formed as illustrated in Figure 1, and is silver soldered to holder 106 whereby brass rod 118 is adapted to support hydrographic apparatus or the like.

Thus it will be seen that a swivel connector has been provided which is characterized by very low internal resistance, and which includes a diaphragm 105 adapted to establish pressure equalization between the interior and exterior of connector 10 to reduce leakage across plug 94. The low internal frictional resistance of connector 10 permits relative rotational movement between tubular element 54 and housing 12 under very low torque forces, and without disturbing electrical circuit continuity between cables 38 and 72.

While certain preferred embodiments of the invention have been specifically disclosed, it is understood that the invention is not limited thereto as many variations will be readily apparent to those skilled in the art and the invention is to be given its broadest possible interpretation within the terms of the following claims:

We claim:

1. A swivel connector for underwater use comprising a housing; a first contact member insulatably carried within said housing; a first cable disposed through one end of said housing and connected to said first contact member; first sealing means disposed about said first cable and closing off said one end of said housing; a tubular member disposed through an opening in the other end of said housing and rotatably carried by said housing; a second contact member insulatably carried at the inner end of said tubular member and in contact with said first contact member, said second contact member being carried in axial alignment with said first contact member so as to maintain contact therebetween during relative rotation between said housing and said tubular member; a second cable disposed through said tubular member and connected to said second contact; second sealing means disposed about said second cable and closing off the outer end of said tubular member; a diaphragm disposed within said housing and subject to underwater pressure; means for filling the open spaces within said housing with insulating fluid; and third sealing means disposed between said tubular member and the walls of the opening in said other end of said housing, and forming the sole seal means tending to impose any frictional resistance to relative rotation between said housing and said tubular member.

2. A swivel connector for underwater use comprising a housing; a first contact member insulatably carried within said housing; a first cable disposed through one end of said housing and connected to said first contact member; first sealing means disposed about said first cable and closing off said one end of said housing; a tubular member disposed through an opening in the other end of said housing and rotatably carried by said housing; a second contact member insulatably carried at the inner end of said tubular member and in contact with said first contact member, said second contact member being carried in axial alignment with said first contact member so as to maintain contact therebetween during relative rotation between said housing and said tubular member; a second cable disposed through said tubular member and connected to said second contact; second sealing means disposed about said second cable and closing off the outer end of said tubular member; means disposed within said housing, said means being subject on one side to pressure within said housing and housing subject to underwater pressure on the other side, and freely movable to equalize said pressures; means for filling the open spaces within said housing with insulating fluid; and third sealing means disposed between said tubular member and the walls of the opening in said other end of said housing, and forming the sole seal means tending to impose any frictional resistance to relative rotation between said housing and said tubular member.

3. A swivel connector for underwater use comprising a longitudinally extending housing; a first contact member insulatably carried within said housing; a first cable disposed through one end of said housing and connected to said first contact member; first sealing means disposed between said first cable and said housing; a tubular member disposed through the other end of said housing and rotatably carried by said housing; a second contact member insulatably carried at the inner end of said tubular member and in contact with said first contact member, said second contact member being adapted to maintain contact with said first contact member during relative rotational movement therebetween; a second cable disposed through said tubular member and connected to said second contact; second sealing means disposed between said second cable and said tubular member externally of said housing; a diaphragm disposed within said housing and subject to underwater pressure; and means for filling the open spaces within said housing with insulating fluid.

4. A swivel connector for underwater use comprising a longitudinally extending housing; a first contact member insulatably carried within said housing; a first cable disposed through one end of said housing and connected to said first contact member; first sealing means disposed between said first cable and said housing; a tubular member disposed through an opening in the other end of said housing and rotatably carried by said housing; a second contact member insulatably carried at the inner end of said tubular member and in contact with said first contact member, said second contact member being adapted to maintain contact with said first contact member during relative rotational movement therebetween; a second cable disposed through said tubular member and connected to said second contact; second sealing means disposed between said second cable and said tubular member externally of said housing; a diaphragm disposed within said housing and subject to underwater pressure; means for filling the open spaces within said housing with insulating fluid; and third sealing means disposed between said tubular member and the walls forming the opening in said other end of said housing, and forming the sole seal means tending to impose any frictional resistance to relative rotation between said housing and said tubular member.

5. A swivel connector for underwater use comprising a longitudinally extending housing, said housing being formed to receive a first cable through one end; a first contact member insulatably carried within said housing and adapted to be connected to said first cable; first sealing means carried by said housing and adapted to be disposed against said first cable in sealing relationship; a tubular member disposed through the other end of said housing and rotatably carried by said housing, said tubular member being adapted to receive a second cable therethrough; a second contact member insulatably carried at the inner end of said tubular member and adapted to be connected to said second cable, said second contact member being in contact with said first contact member and adapted to maintain said contact during relative rotational movement therebetween; second sealing means carried by said tubular member and adapted to be disposed against said second cable in sealing relationship; and means movably disposed within said housing and subject to underwater pressure, the open spaces within said housing being adapted to be filled with insulating fluid.

6. A swivel connector for underwater use comprising a longitudinally extending housing, said housing being formed to receive a first cable through one end; a first contact member insulatably carried within said housing and adapted to be connected to said first cable; first sealing means carried by said housing and adapted to be disposed against said first cable in sealing relationship; a tubular member disposed through an opening in the other end of said housing and rotatably carried by said housing, said tubular member being adapted to receive a second cable therethrough; a second contact member insulatably carried at the inner end of said tubular member and adapted to be connected to said second cable, said second contact member being in contact with said first contact member and adapted to maintain said contact during relative rotational movement therebetween; second sealing means carried by said tubular member and adapted to be disposed against said second cable in sealing relationship; said housing and said tubular member having complementary wall portions defining a fluid chamber therebetween open at one end; a diaphragm disposed within said fluid chamber, said diaphragm being subject to underwater pressure; and third sealing means disposed between said tubular member and the walls of the opening in said other end of said housing, and forming the sole seal means tending to impose any frictional resistance to relative rotation between said housing and said tubular member.

7. A swivel connector for underwater use comprising a longitudinally extending housing, said housing being formed to receive a first cable through one end; a first contact member insulatably carried within said housing and adapted to be connected to said first cable; first sealing means carried by said housing and adapted to be disposed against said first cable in sealing relationship; a tubular member disposed through the other end of said housing and rotatably carried by said housing, said tubular member being adapted to receive a second cable therethrough; a second contact member insulatably carried at the inner end of said tubular member and adapted to be connected to said second cable, said second contact member being in contact with said first contact member and adapted to maintain said contact during relative rotational movement therebetween; bias means disposed in engagement with at least one of said contact members to exert its bias to maintain said contact members in contacting relationship; second sealing means carried by said tubular member and adapted to be disposed against said second cable in sealing relationship; and means disposed within said housing and responsive to underwater pressure to equalize the pressure within said housing with said underwater pressure, the open spaces within said housing being adapted to be filled with insulating fluid.

8. A swivel connector comprising a longitudinally extending housing, said housing being formed to receive a first cable through one end; a first contact member carried within said housing and adapted to be connected to said first cable; a tubular member coaxially disposed through an opening in the other end of said housing and rotatably carried by said housing, said tubular member being adapted to receive a second cable therethrough; a second contact member carried at the inner end of said tubular member and adapted to be connected to said second cable, said second contact member being in contact with said first contact member; a diaphragm movably disposed within said housing and subject to underwater pressure, the open spaces within said housing being adapted to be filled with insulating fluid; and sealing means disposed between said tubular member and the walls forming the opening in said other end of said housing, and forming the sole seal means tending to impose any frictional resistance to relative rotation between said housing and said tubular member.

9. A swivel connector according to claim 8 wherein said sealing means is an annular member having a diameter only slightly greater than the inner diameter of said tubular member.

10. A swivel connector comprising a longitudinally extending housing, said housing being formed to receive a first cable through one end; a first contact member carried within said housing and adapted to be connected to said first cable; a tubular member coaxially disposed through the other end of said housing and rotatably carried by said housing, said tubular member being adapted to receive a second cable therethrough; a second contact member carried at the inner end of said tubular member and adapted to be connected to said second cable, said second contact member being in contact with said first contact member; means disposed within said housing, said means being subject on one side to pressure within said housing and subject on the other side to underwater pressure, and freely movable to equalize said pressures; and means permitting the open spaces within said housing to be filled with insulating fluid.

References Cited in the file of this patent

UNITED STATES PATENTS

| | | |
|---|---|---|
| 2,414,957 | Larrabure | Jan. 28, 1947 |
| 2,886,626 | Burnett et al. | May 12, 1959 |

FOREIGN PATENTS

| | | |
|---|---|---|
| 795,322 | Great Britain | May 21, 1958 |